US008605110B2

(12) United States Patent
Jang et al.

(10) Patent No.: US 8,605,110 B2
(45) Date of Patent: *Dec. 10, 2013

(54) TERMINAL DEVICE HAVING CORRECTION FUNCTION FOR NATURAL COLOR AND METHOD THEREOF

(71) Applicant: Samsung Electronics Co., Ltd., Suwon-si (KR)

(72) Inventors: Mi-jung Jang, Suwon-si (KR); Kyeong-man Kim, Suwon-si (KR); Hyun-soo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,859

(22) Filed: Oct. 24, 2012

(65) Prior Publication Data
US 2013/0120773 A1 May 16, 2013

Related U.S. Application Data

(63) Continuation of application No. 13/373,045, filed on Nov. 3, 2011, now Pat. No. 8,325,201, which is a continuation of application No. 11/367,307, filed on Mar. 6, 2006, now Pat. No. 8,077,186.

(30) Foreign Application Priority Data

Sep. 21, 2005 (KR) .................. 10-2005-0087625

(51) Int. Cl.
*G09G 5/02* (2006.01)

(52) U.S. Cl.
USPC ........... 345/594; 345/589; 345/590; 345/593; 345/604; 345/549; 382/167; 382/274; 715/716; 715/810

(58) Field of Classification Search
None
See application file for complete search history.

(56) References Cited

U.S. PATENT DOCUMENTS 5,369,472 A 11/1994 Raj et al.
6,169,536 B1 1/2001 Lee et al.
(Continued)

FOREIGN PATENT DOCUMENTS

| JP | 2003-044006 | 2/2003 |
| JP | 2003-099026 | 4/2003 |
| KR | 10-2001-0063827 | 7/2001 |
| KR | 10-2004-0036789 | 5/2004 |

OTHER PUBLICATIONS

Padilla, Mike, "Design Interactive Error Handling for Web Apps", Feb. 14, 2005, http://www.ibm.com/developerworks/library/wa-er-rhand/index.html?ca=drs-tp0705. Accessed Apr. 29, 2010.

*Primary Examiner* — Antonio A Caschera
(74) *Attorney, Agent, or Firm* — Roylance, Abrams, Berdo and Goodman, LLP (57) ABSTRACT

A terminal device having a correction function for natural color and a method thereof are provided for creating an image closest in color to the natural color. A priority storing unit stores at a reference color data area a range of natural colors which are colors of objects existing in the natural world. A color editing unit corrects natural color image data corresponding to the natural color area, based on a command for correcting the natural area existing in a predetermined image from the user. A controlling unit decides whether the natural color image data corrected by the color editing unit is included in the reference color data area.

6 Claims, 6 Drawing Sheets

(56) References Cited

U.S. PATENT DOCUMENTS

| | | |
|---|---|---|
| 6,229,580 B1 | 5/2001 | Inoue |
| 7,016,075 B1 | 3/2006 | Tsukada |
| 7,039,222 B2 | 5/2006 | Simon et al. |
| 7,394,469 B1 | 7/2008 | Liu et al. |
| 7,613,335 B2 | 11/2009 | McLennan et al. |
| 8,077,186 B2 | 12/2011 | Jang et al. |
| 8,325,201 B2 * | 12/2012 | Jang et al. ............. 345/594 |
| 2005/0146734 A1 | 7/2005 | Stokes et al. |
| 2012/0127496 A1 | 5/2012 | Jang et al. |

* cited by examiner

TERMINAL DEVICE HAVING CORRECTION FUNCTION FOR NATURAL COLOR AND METHOD THEREOF

CROSS-REFERENCE TO RELATED APPLICATIONS

This application is a continuation of U.S. application Ser. No. 13/373,045, filed Nov. 3, 2011, now U.S. Pat. No. 8,325,201, which is a continuation of U.S. application Ser. No. 11/367,307, filed Mar. 6, 2006, now U.S. Pat. No. 8,077,186, which claims the benefit under 35 U.S.C. §119(a) of Korean Patent Application No. 2005-87625, filed Sep. 21, 2005 in the Korean Intellectual Property Office, the entire disclosure of both applications being hereby incorporated by reference.

BACKGROUND OF THE INVENTION

1. Field of the Invention

The present invention relates to a terminal device having a correction function for natural color and a method thereof. More particularly, the present invention relates to a terminal device having a correction function for natural color and a method thereof capable of correcting the natural color by indicating in real time on a screen whether the natural color corrected by a user is included in a reference image data area preset in accordance with the natural color.

2. Description of the Related Art

Recently, distribution of terminal devices has increased, such as, desktop computer or laptop, while prices are decreasing for computer peripheral devices operated by interfacing with the terminal devices. With such price decrease, a distribution of color image inputting and outputting devices, such as, a printer and monitor has increased.

Because of each characteristic in a given color image, most color image inputting and outputting devices do not create the same color or colors within limited range of minimal errors. For example, the printer may have a different color system from another color image inputting and outputting device, such as, the monitor. Accordingly, most colors delivered on the monitor are different from the printer.

In other words, the color of prints output from the printer depends on an image type created at the terminal device by adjusting the color of the image displayed on the monitor connected to the terminal device. Once the adjusted image is printed through the printer, the printed image may comprise a different color from the image indicated through the monitor.

The printed image color is different from the image indicated through the monitor because each color image inputting and outputting device has a different system. That is, the color system used at the monitor comprises RGB (Red, Green, Blue), while the color system for the printer may comprise CMYK (Cyan, Magenta, Yellow, Black).

A RGB system may consists of three primary colors and is used at the printer, television (TV), and other image outputting devices, which embody the color with a principle of light. The more colors are mixed, the brighter colors are delivered. Likewise, a method of generating an image by mixing colors refers to as an additive color mixture. On the other hand, a CMYK system generates several colors by mixing colors and becoming turbid, and the image generating method is referred to as a subtractive color mixture.

Figure 1:
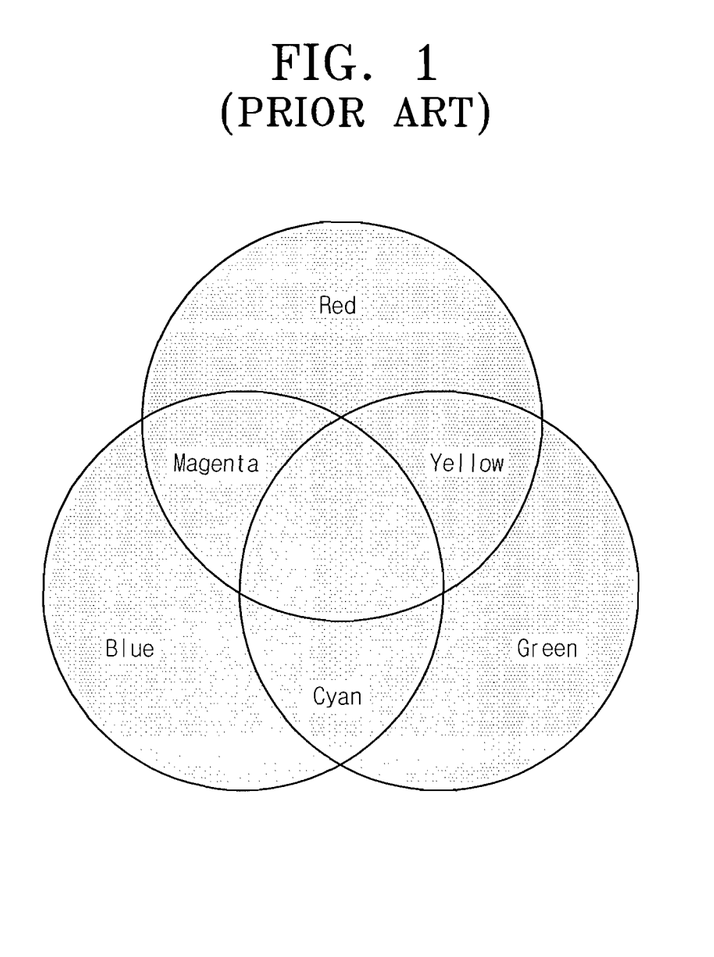
FIG. 1 shows a relationship between a RGB color model and CMYK color model.

FIG. 1 shows a relationship between a RGB color model and CMYK color model.

As shown in FIG. 1, the RGB system may be used to create the CMYK system. That is, the mixture between red and blue produces magenta, and the mixture between blue and green produces cyan. The mixture between green and red produces yellow. The color black (K) is added separately at the CMYK model because a CMY mixture can not generate the color black. Therefore, ink or toner can be saved.

As described above, a color matching process which converts the RGB color model into the CMYK color model is performed in order to output as prints an image indicated on the monitor. If the color adjusted by the user through the monitor is not accurate, even if the color matching process is performed, the color of the image output on paper may be distorted.

Natural colors such as skin color, sky color and green grass color are more difficult to adjust through the monitor by the user. Accordingly, the image quality output on the paper may be deteriorated. Therefore, the color image inputting and outputting devices need to output the same color, regardless of manufacturer, device type or device method.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a terminal device having a correction function for natural color and a method thereof, informing a user of a current correction state by indicating whether image data, corresponding to a currently corrected area, is included in a reference image data area, which is similar to the natural color.

In order to achieve the above-described aspects of exemplary embodiments of the present invention, a terminal device is provided where, a priority storing unit stores at a reference color data area a range of natural colors which are colors of objects existing in a natural world. A color editing unit corrects natural color image data corresponding to the natural color area, according to a command for correcting the natural area existing in a predetermined image from the user. A controlling unit determines whether the natural color image data corrected by the color editing unit is included at the reference color data area.

In an exemplary implementation, the natural color may be at least one of skin color, sky color and green grass color.

The reference color data area comprises a stereographic coordinate data form indicating L* (lightness), a* (between red and green) and b* (between yellow and blue) defined by Commission Internationale de l'Eclairage (CIE) in CIELAB color space, and the controlling unit converts the natural color image data into the stereographic coordinate data form and determines whether the natural color image data is included in the reference color data area.

In another exemplary implementation, the terminal device comprises a user interface (UI) generating unit for generating a UI window where an image indicating window displays the image. A natural color selecting window selects at least one of skin color, sky color and green grass color, which are included in the natural color area. A color adjusting window adjusts at least one of lightness, chroma and hue in accordance with the selected area.

The UI generating unit generates the image indicating window so that an indication is made, by masking the natural color area, as to whether the natural color image data is included in the reference color data area, by masking the natural color area.

In order to achieve the above-described aspects of exemplary embodiments of the present invention, a method of correcting a natural color of a terminal device is provided. A range of natural color, which comprises a color of objects existing in the natural world, is stored. Natural color image data, corresponding to the natural color area, is corrected according to a command for correcting the natural area existing in a predetermined image from the user. A determination is made as to whether the natural color image data corrected by the color editing unit is included in the reference color data area.

In an exemplary implementation, the natural color may be at least one of skin color, sky color and green grass color.

The reference color data area comprises a stereographic coordinate data form indicating L*, a* and b* defined by Commission Internationale de l'Eclairage (CIE) in CIELAB color space, and the controlling unit converts the natural color image data into the stereographic coordinate data form and determines whether the natural color image data is included in the reference color data area.

In another exemplary implementation, an UI window is generated, which comprises an image indicating window that displays the image. A natural color selecting window selects at least one of skin color, sky color and green grass color, which are included in the natural color area. A color adjusting window adjusts at least one of lightness, chroma and hue in accordance with the selected area.

Further, in an exemplary implementation, an indication is made, by masking the natural color area, on the image indicating window as to whether the natural color image data is in the reference color data area.

BRIEF DESCRIPTION OF THE DRAWING FIGURES

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
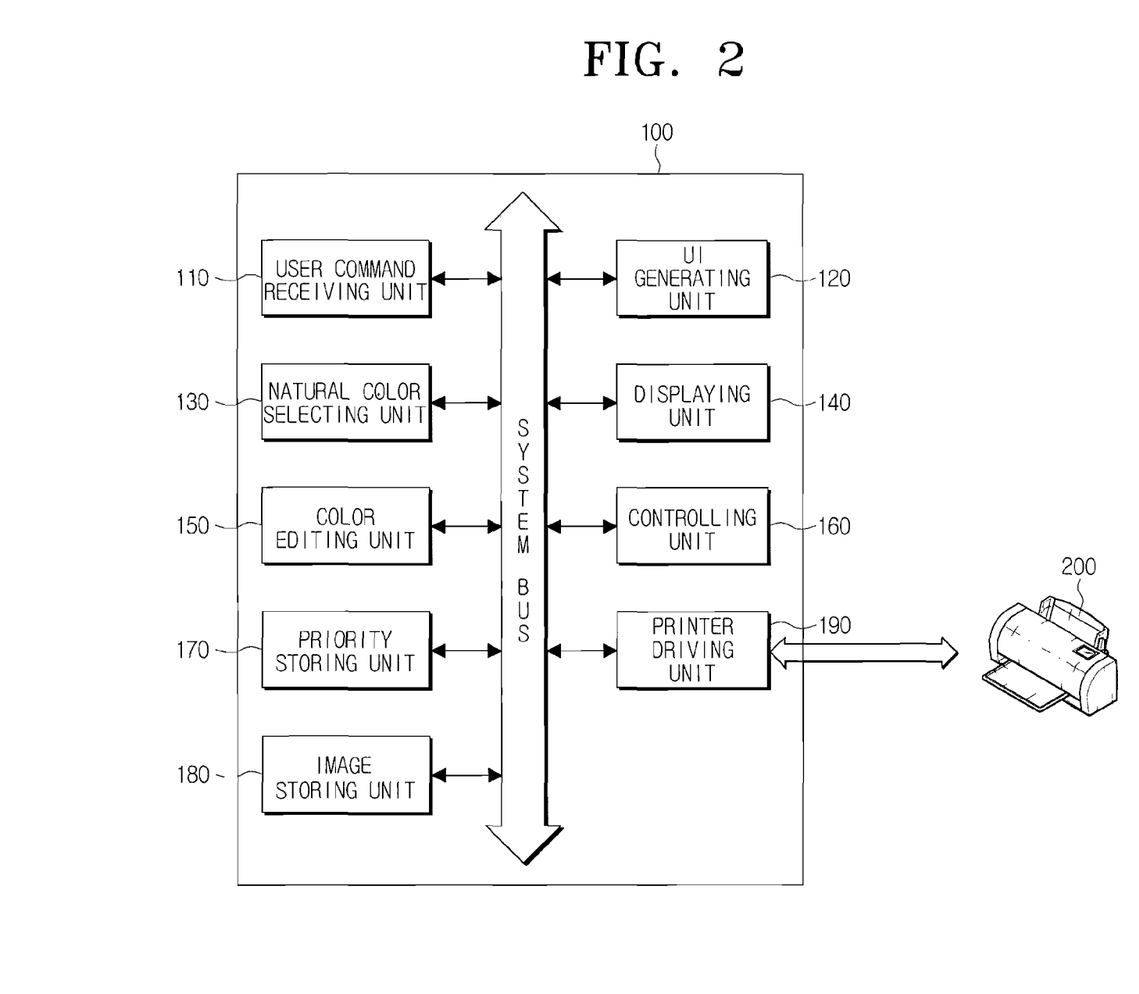
FIG. 2 is a block diagram showing a structure of a terminal device according to an exemplary embodiment of the present invention.

FIG. 2 is a block diagram showing a structure of a terminal device according to an exemplary embodiment of the present invention.

Referring to FIG. 2, the terminal device 100 comprises a user command receiving unit 110, UI generating unit 120, natural color selecting unit 130, displaying unit 140, color editing unit 150, controlling unit 160, priority storing unit 170, image storing unit 180 and printer driving unit 190.

The user command receiving unit 110 receives the user command input through a keyboard (not shown) or a mouse (not shown), and transmits to the controlling unit 160, which will be described later. That is, the user command receiving unit 110 receives an image selection command for selecting a predetermined image and a command for correcting natural color image data corresponding to a natural color area included in an image, and transmits to the controlling unit 160. The natural color area includes an area where the natural color, which is a color of an object existing in the natural world (that is, skin of a human, a sky and green grass), exists on an image displayed on a screen.

The UI generating unit 120 generates the UI window for correcting the natural color image data. The user can select through the UI window at least one of skin color area, sky color area and green grass area of the image. The UI generating unit 120 may adjust at least one of lightness, chroma, and hue in accordance with the selected area.

The displaying unit 140 displays the selected image and the UI window generated by the UI generating unit 120 on the screen. The selected image may be displayed on an image window or on the screen as an independent window.

The natural color selecting unit 130 selects the natural color area included in the image displayed on the screen. That is, the natural color selecting unit 130 extracts the natural color image data, corresponding to the natural color area, from the image data, corresponding to the image. The natural color selecting unit 130 then transmits to the color editing unit 150, which will be described later.

The color editing unit 150 edits the natural color image data according to the command for correcting the natural color image data transmitted from the controlling unit 160. For example, the color editing unit 150 receives a natural color selection command and a color adjusting command from the controlling unit 160, edits the natural color image data corresponding to at least one of skin color area, the sky color area and green grass color area, and transmits the edited natural color image data to the controlling unit 160.

The controlling unit 160 converts the edited natural color image data into a stereographic coordinate data form indicating L* (lightness), a* (between red and green) and b* (between yellow and blue) defined in the Commission Internationale de l'Eclairage (CIE) in CIELAB color space, and determines whether the converted natural color image data is included in a reference color data area stored at the priority storing unit 170, which will be described.

When the controlling unit 160 determines that the converted natural color image data is not included in the reference color data area, a warning message is output for warning a user, or the displaying unit 140 is controlled to display the natural color area corresponding to the natural color image data as a predetermined mask area.

The priority storing unit 170 is stored with the reference color data area in the stereographic coordinate data form indicating L*, a* and b*. That is, the reference color data areas corresponding to skin color, sky color and green grass color, respectively, are stored at the priority storing unit 170 as L*, a* and b*.

The image storing unit 180 is stored with image data corresponding to the image for the user to print.

When receiving the command for printing through the user command receiving unit 110, the printer driving unit 190 converts the image data corresponding to the image into printable image data at the printer 200, according to the control of the controlling unit 160, and transmits to the printer 200.

Figure 3:
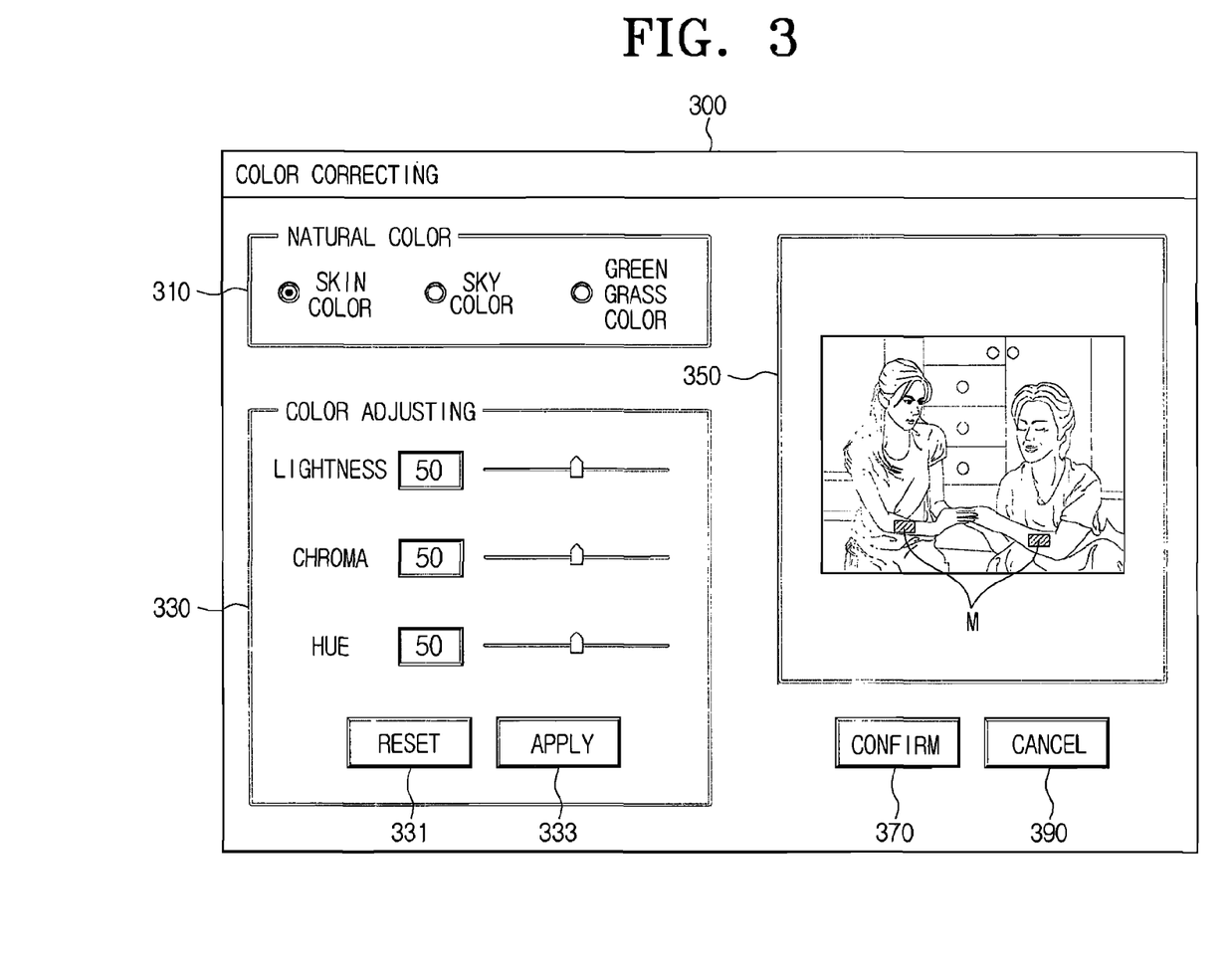
FIG. 3 shows a user interface (UI) window for correcting a natural color by the terminal device according to an exemplary embodiment of the present invention.

FIG. 3 shows a UI window for correcting a natural color by the terminal device according to an exemplary embodiment of the present invention.

Referring to FIG. 3, a color correcting window 300 correcting the natural color includes a natural color selecting window 310, color adjusting window 330, and image indicating window 350.

The natural color selecting window 310 selects the natural color image data corresponding to the natural color area included in a predetermined image. In an exemplary implementation, the skin color area, sky color area and green grass color area are referred to as the natural color area. The user selects through the natural color selecting window 310 the natural color area, which includes at least one of skin color area, sky color area and green grass color area.

The color adjusting window 330 adjusts at least one of lightness, chroma and hue in accordance with the selected natural color areas. For example, the user refers to the image displayed on a screen through the color adjusting window 330 and adjusts at least one of lightness, chroma and hue.

The image indicating window 350 displays the image selected according to the command for selecting the image. The image which is adjusted in at least one of lightness, chroma, and hue is also displayed. When the reference color data area does not include the natural color image data, corresponding to the natural color area included in the adjusted image in at least one of lightness, chroma and hue, the natural color area is indicated as a mask area (M), or a warning message is output for the user to determine a correction problem.

Figure 4A:
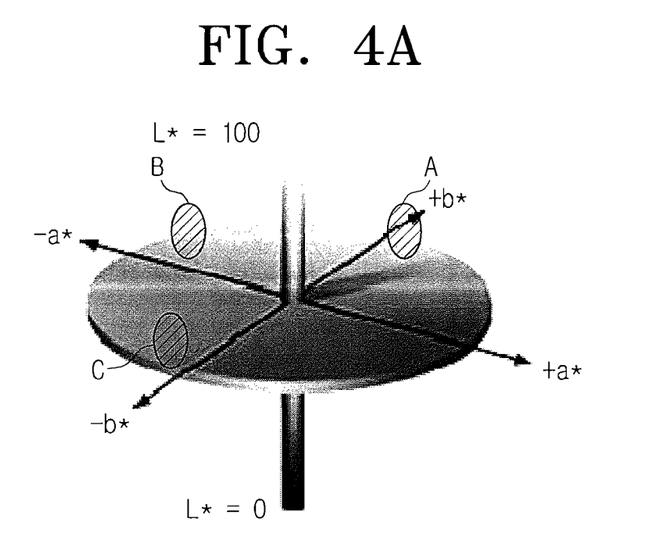
FIGS. 4a and 4b show a LAB color space related to correcting the natural color by the terminal device according to an exemplary embodiment of the present invention.
Figure 4B:
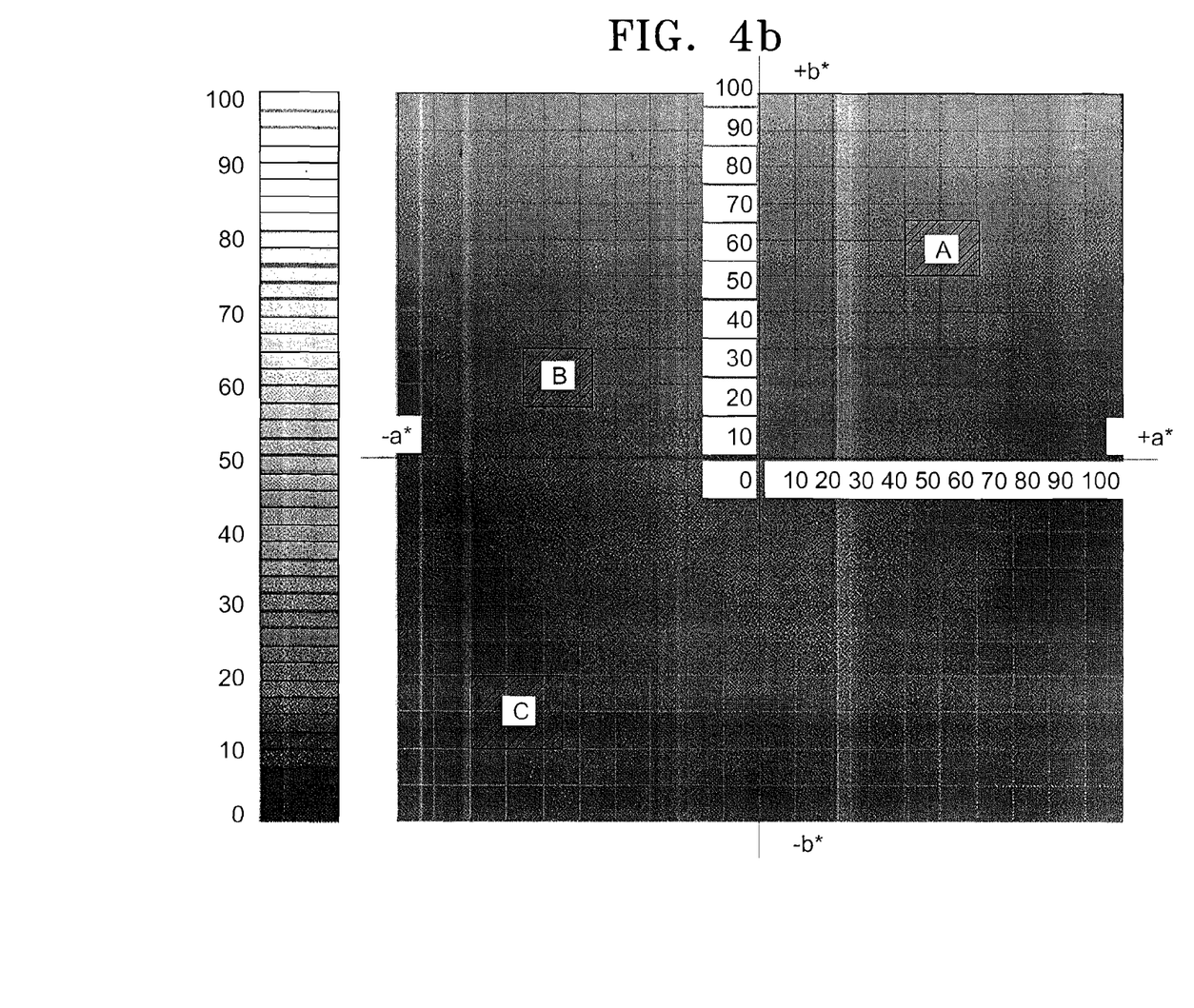

FIGS. 4a and 4b show a LAB color space related to correcting the natural color by the terminal device according to an exemplary embodiment of the present invention.

The LAB color space color data defined by CIE and the color coordinate are stereographic indicated as L*, a* and b*. In another exemplary implementation, L* is referred as lightness, a* is referred as between red and green and b* is referred as between yellow and blue. In a further exemplary implementation, L*=100 is close to white which refers to color of light source, while L*=0 is close to black; and a*=80 is more red than a*=50, while b*=50 is more yellow than b*=20.

Referring to FIG. 4a, skin color that is closest to the natural color is included in a reference color data area corresponding to area A; green grass color closest to the natural color is included in a reference color data area corresponding to area B; and sky color closest to the natural color is included in a reference color data area corresponding to area C.

Referring to 4b, the reference color data area corresponding to area A is L*=22~27, a*=+40~+60 and b*=+50~+65; to area B is L*=15~95, a*=−47~−67 and b*=+12~+30; and to area C is L=18~98, a*=−55~−80 and b*=−60~−80.

The reference color data area, as described above, may be obtained from an experiment, and when the natural color image data is not included in the reference color data area, the natural color area corresponding to the natural color image data is indicated on the screen as a mask area (M) or a warning message.

Figure 5:
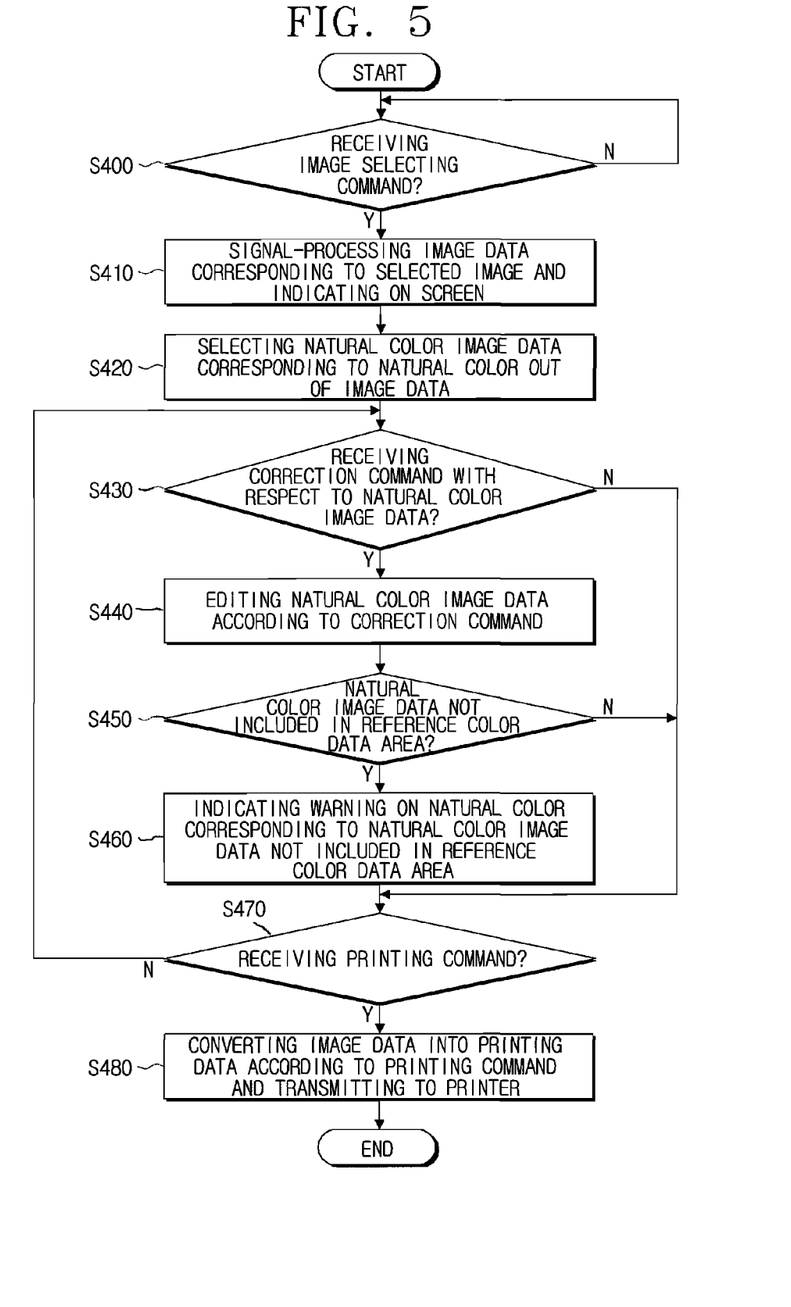
FIG. 5 is a flowchart provided to explain an operation of the terminal device according to an exemplary embodiment of the present invention.

FIG. 5 is a flowchart provided to explain an operation of the terminal device according to an exemplary embodiment of the present invention.

Referring to FIG. 5, a determination is made as to whether a command for selecting an image is received from the user command receiving unit 110 (S400).

If the command for selecting the image is received, the image data corresponding to the selected image is signal-processed and indicated in the image indicating window 350 (S410).

The natural color image data corresponding to the natural color is selected among the image data. That is, the natural color selecting unit 130 extracts the natural color image data corresponding to the natural color area, such as, skin color area, sky color area and green grass color area included in the selected image, from the image data (S420).

In an exemplary implementation, a determination is made as to whether a command for correcting, in accordance with the natural color image data, is received from the user command receiving unit 110 (S430).

If the command for correcting is received, the natural color image data is edited according to the command for correcting.

If the user adjusts at least one of the lightness, chroma and hue of the image indicated on the image indicating window 350 through the color adjusting window 330, the color editing unit 150 edits the natural color image data according to the adjustment (S440).

If a determination is made that the natural color image data is not included in the reference color data area (S450), the controlling unit 160 masks the natural color area, corresponding to the natural color image data not included in the reference color data area, and indicates the mask area (M) in the screen, or outputs the warning message stating that "A natural color area is away from a priority range" (S460).

If the command for printing is received from the user command receiving unit 110 according to the user's needs (S470), the image data is converted into the printing data and transmitted to the printer 200 according to the command for printing (S480).

With reference to the above process, to confirm a correction state of the natural color area included in the image is enabled.

As described above, an indication is provided on the screen as to whether the image data corresponding to a currently corrected area is included in the reference image data area closest to the natural color, so that the user may correct the natural color and image quality printed on paper may be enhanced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of correcting a natural color of a terminal device comprising a user interface (UI) generating unit, a color editing unit, and a controlling unit, the method comprising:

pre-storing a range of natural color which are in the natural world as a reference color area;

providing a UI window via the UI generating unit comprising an image indicating window to indicate an image from a user and to receive a command for correcting color of at least part of the image;

correcting natural color image data corresponding to the range of natural colors of the image via the color editing unit in response to the command through the UI window;

indicating whether or not the natural color image data are included in the pre-stored reference color data area on the UI window by masking the natural color area, and determining via the controlling unit whether the reference color data area comprises the natural color image data corrected by the color editing unit in real time; and printing the corrected natural color image.

2. The method of correcting the natural color of claim 1, wherein the natural color comprises at least one of skin color, sky color and green grass color.

3. The method of correcting the natural color of claim 1, wherein the reference color data area comprises:
 a stereographic coordinate data form indicating L*, a* and b* defined by Commission Internationale de l'Eclairage in CIELAB color space, and
 the controlling unit converts the natural color image data into the stereographic coordinate data form and determines whether the reference color data area comprises the natural color image data.

4. The method of correcting the natural color of claim 1, wherein the UI window comprises:
 an image indicating window for indicating the image,
 a natural color selecting window for selecting at least one of skin color, sky color and green grass color, the natural color area comprising the skin color, sky color and green grass color, and
 a color adjusting window for adjusting at least one of lightness, chroma and hue in accordance with the selected area.

5. The method of correcting the natural color of claim 1, further comprising:
 a displaying step for displaying a warning message if the corrected natural color image is not included in the reference color data area in real time.

6. The method of correcting the natural color of claim 1, wherein the indicating step further comprises displaying a warning message if the corrected natural color image is not included in the reference color data area in real time.

* * * * *